July 27, 1965 I. COHEN ETAL 3,196,733
FASTENER ASSEMBLY
Filed Feb. 28, 1961
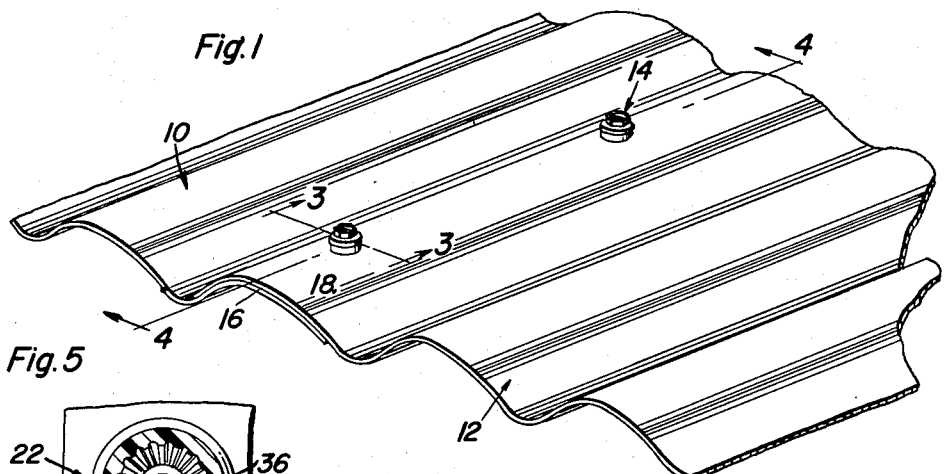
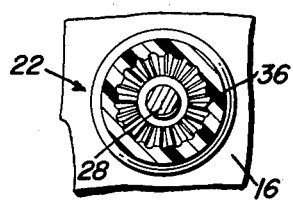
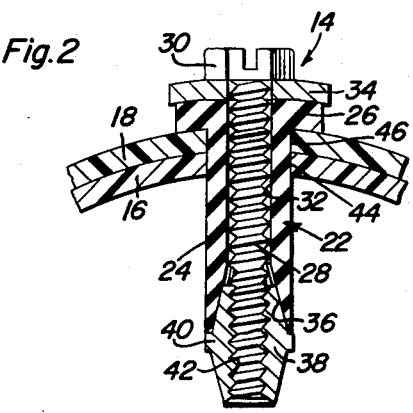
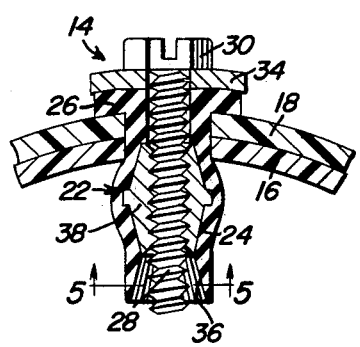
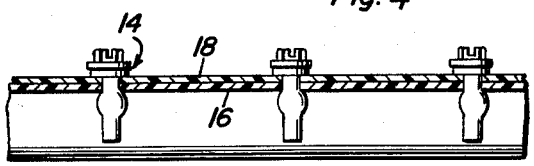
Irvin Cohen
Bernard D. Levy
INVENTORS United States Patent Office
3,196,733
Patented July 27, 1965

3,196,733
FASTENER ASSEMBLY
Irvin Cohen, Reading, and Bernard D. Levy, Pittsburgh, Pa., assignors to Construction Fasteners, Inc., Reading, Pa., a corporation of Pennsylvania
Filed Feb. 28, 1961, Ser. No. 92,188
2 Claims. (Cl. 85—75)

This invention relates to sealing joint assemblies between overlapping curved portions of corrugated type panel members commonly used for roof panels and other sheltering panel constructions.

The corrugated panels with which the present invention is concerned are commonly used today because of the ease with which such panels may be installed and the protection that it affords in addition to its other attributes. Accordingly, the facilities provided for joining adjacent panel sections when installing the corrugated panel construction and the effectiveness of the joint both as to strength and its ability to resist the deleterious effect of the surrounding atmosphere, is of utmost importance. The present invention therefore provides an improved joint assembly between overlapping portions of the corrugated type of panels by means of which the panel sections may be joined together more rapidly, with less effort than was heretofore thought possible. An important object of this invention therefore is to effect a tremendous saving in time and labor in joining corrugated panel sections when installing a corrugated panel assembly.

Another object of this invention is to provide an improved corrugated panel joint assembly which will afford a more enduring connection between the panel sections and provide a more effective seal therebetween.

An additional object of this invention is to provide fastener devices for joining overlapping panel portions of corrugated panel members, which fastener devices will provide a more effective seal and are more easily installed because they are insertable while held in assembled condition and are more easily tightened by applying a tool from above the panel without holding the nut below the panels. Also, the sealing pressure applied to the overlapping panel portions by the fastener device is effected without damage to the panel surfaces.

These together with other objects and advantages which become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of a joint assembly between a pair of overlapping corrugated panel sections utilizing the novel fastener devices of the present invention.

FIGURE 2 is a cross sectional view through a fastener device in assembled condition prior to tightening thereof.

FIGURE 3 is a sectional view taken through a plane indicated by section line 3—3 in FIGURE 1 illustrating the fastener device in a tightened condition.

FIGURE 4 is a sectional view taken through a plane indicated by section line 4—4 in FIGURE 1.

FIGURE 5 is a sectional view taken through a plane indicated by section line 5—5 in FIGURE 3.

Referring now to the drawings in detail, FIGURE 1 illustrates the novel joint assembly between adjacent panel sections 10 and 12 of corrugated type panel members. As indicated in FIGURE 1, the joint assembly is effected by a plurality of longitudinally spaced fastener devices 14 which are disposed centrally along overlapping curved portions 16 and 18 of the panel sections 10 and 12 respectively.

Referring now to FIGURE 2, it will be observed that the fastener devices includes a tubular seal member 22 which is made of flexible material capable of being deformed. The flexible tubular seal member 22 includes a cylindrical portion 24 when not deformed having a flexible pressure distributing flange portion 26 at the upper end of the cylindrical portion 24. A screw member 28 including a slotted head 30 is insertable through the bore 32 within the flexible tubular member 22. Disposed between the head 30 of the screw member 28 and the flange portion 26 of the tubular member 22, is a relatively rigid dished washer 34 establishing a bearing surface for the head 30. Also disposed at the lower end of the tubular member 22 is a tapered bore portion 36 having a serrated grip surface. The grip surface is provided for the purpose of cooperating with a nut member 38 which has a pair of oppositely directed tapered portions separated by an annular shoulder portion 40 so that either of the tapered portions may be fitted into the lower end of the tubular member 22 for gripping engagement with the serrated surface 36 when the shoulder 40 abuts the lower end of the tubular member 22. The nut member 38 is also provided with an internally threaded bore 42 for threaded engagement with the threads on the screw member 28.

The parts of the fastener device 14 are assembled as shown in FIGURE 2 by threaded engagement of the lower end portion of the screw member 28 within the nut member 38 so as to exert axial force on the shoulder portion 40 thereof sufficient to hold the nut member at the lower end of the flexible tubular member 22. The fastener device so assembled may then be inserted through the aligned apertures 44 and 46 within the overlapping panel portions 16 and 18 respectively. The fastener device 14 may then be tightened into sealing relation to the overlapping panel portion by applying a screwdriver to the head 30 or a socket wrench as to rotate the screw member. Inasmuch as a portion of the nut member 38 is initially embraced within into the lower end of the tubular member 22 with the tapered surface thereof in gripping engagement with the grip surface 36, rotation of the screw member 28 after the fastener device has been inserted will cause the nut member 38 to be axially displaced upwardly into the flexible tubular member 22 with an increasing resistance to rotation thereof being applied by means of the grip surface 36, as the nut member 38 moves into the narrowing portion of the tapered grip bore 36. The nut member 38 will finally assume a position entirely within the tubular member as illustrated in FIGURES 3 and 4 whereby the tubular member 22 is deformed outwardly so as to prevent disassembly of the fastener device 14 and also apply sealing pressure to the underside of the panel portion 16 by means of the bulged portion. It should be appreciated that the bulge is not formed by axial pressure exerted at a lower end of the tubular member as in prior art fastener assemblies. This is significant because such axial pressure would expand the resilient material throughout the axial length of the tubular member including the portion within the apertures 44 and 46 to shift alignment thereof during tightening of the fastener assembly prior to clamping of the panel sections. Thus, the bulge formed in the present case is formed by expansion of the material about the nut 38. Accordingly, the overlapping portions 16 and 18 are joined to each other with an effective seal and with a pressure which does not tend to flatten the portions out by clamping of the panel sections between the screw head and the nut and cause weakening stresses to be applied to the panel sections. It will further be apparent, that both insertion of the screw member 28 and the tightening action of the fastener device effected by applying rotative torque to the screw member is achieved from above only, the holding of the nut member 38 from below being unnecessary in view of the rotative resistance applied to the nut with an increasing amount as the nut is axially displaced upwardly into tightening position. Accordingly, assembling and tightening of the fastener devices is rendered less difficult and may be effected more rapidly in addition to the protective disposition of the nut 38 within the tubular member when in its sealing position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fastener assembly for connecting overlapping panel portions of panel members comprising, deformable tubular seal means having a flexible pressure distributing seal portion disposed at one end of the tubular seal means, grip surface means disposed within the tubular seal means at an end opposite said one end, rigid insert means insertable within said opposite end of the tubular seal means and engageable with the grip surface means to resist rotation thereof, and fastener tightening means insertable through the tubular seal means from said one end for operative engagement with the insert means to maintain the insert means in an assembled position in the tubular seal means and subsequently displace the insert means entirely within the tubular seal means for outwardly deforming the tubular seal means thereabout, said insert means comprising a nut member having oppositely tapered portions separated by an annular shoulder for initially abutting against said opposite end of the tubular seal means when in assembled position therein, and thereafter produce expansion thereof along the tapered portions of the nut member.

2. The combination of claim 1, wherein said fastener tightening means comprises an elongated screw member having a head and threadedly engageable with the insert means for axial displacement thereof on the screw member in response to rotation of the screw member with an increasing resistance to rotation applied to the insert means by the grip surface means as the insert means is axially displaced toward the deforming position, and a relatively rigid dished washer disposed above the upper flexible seal portion of the tubular seal means and below the head of the screw member.

References Cited by the Examiner

UNITED STATES PATENTS

| 2,365,372 | 12/44 | Allen | 85—2.4 X |
| 2,610,013 | 9/52 | Gibson | 85—2.4 X |
| 2,884,100 | 4/59 | McKee | 50—201 |
| 2,918,841 | 12/59 | Poupitch | 85—2.4 X |
| 2,923,386 | 2/60 | Harry | 50—201 |
| 3,021,927 | 2/62 | McKee | 189—36 |

RICHARD W. COOKE, JR., *Primary Examiner.*

CORNELIUS D. ANGEL, JACOB L. NACKENOFF, *Examiners.*